Sept. 2, 1969  E. L. BARRETT  3,464,106
METHOD FOR WINDING COILS
Original Filed June 18, 1962
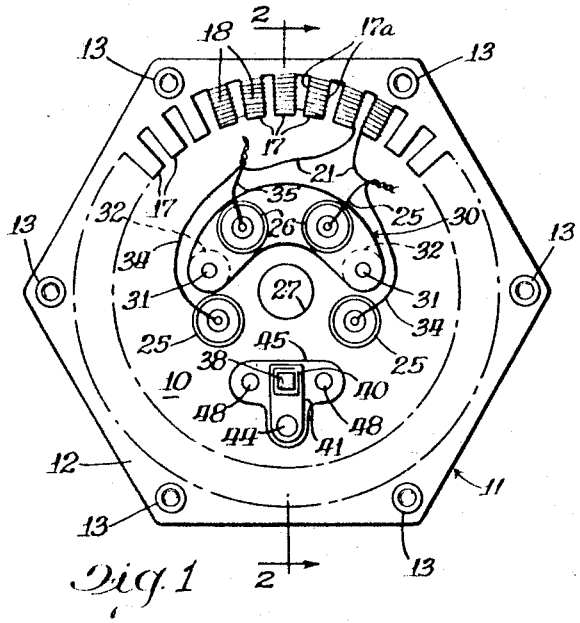
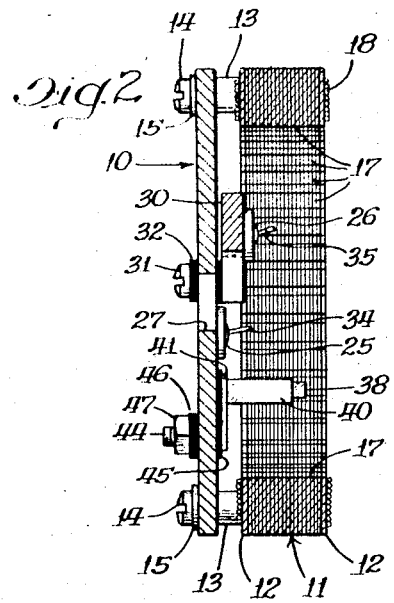
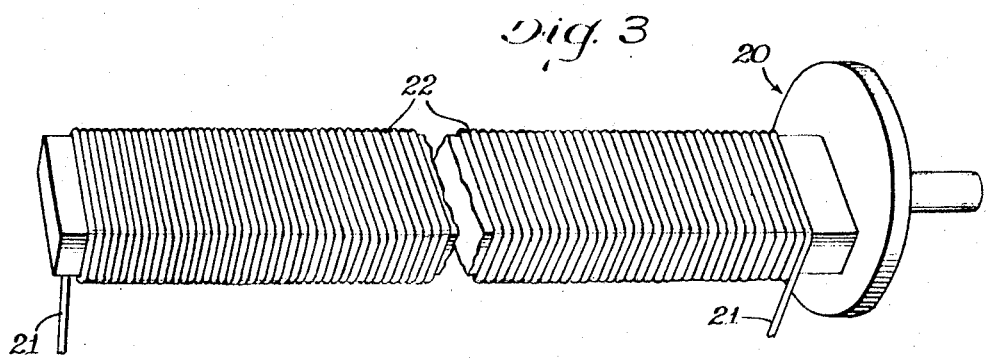
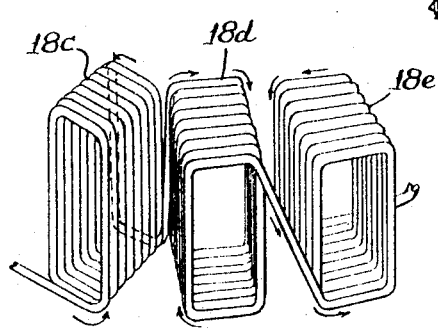
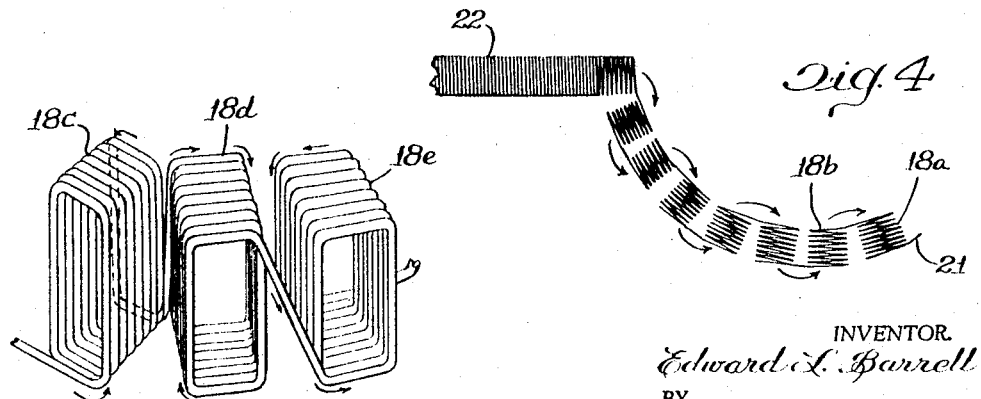
INVENTOR.
Edward L. Barrett
BY
Snow and Benno
Attys.

United States Patent Office 3,464,106
Patented Sept. 2, 1969

3,464,106
METHOD FOR WINDING COILS
Edward L. Barrett, La Grange Park, Ill., assignor of eleven percent each to Louis K. Pohl, Oak Park, H. P. Reynolds, Wilmette, and Frank A. Furar, Riverside, Ill., and William G. Pohl
Original application June 18, 1962, Ser. No. 203,023, now abandoned. Divided and this application Mar. 10, 1966, Ser. No. 533,347
Int. Cl. H02k 15/04; H01f 7/06
U.S. Cl. 29—596                                                5 Claims

ABSTRACT OF THE DISCLOSURE

The invention concerns a method for providing an alternator winding of a series of interconnected coils wherein the coils are each of a single layer of windings, adjacent coils are of opposite polarity and interconnected by an unbroken conductor comprising part of the winding conductor, and with all of the coils being initially wound in one direction on a single mandrel.

---

This invention relates generally to a method for winding coils for alternating-current generators, and more particularly to a novel method for winding coils before mounting thereof on the poles of an alternating-current generator or alternator. The subject application is a division of the copending application of the same inventor, Ser. No. 203,023, filed June 18, 1962, now abandoned, for Alternator Construction.

The primary object of the present invention is to provide a novel method for winding and assembling the current producing or stator windings of an alternator.

Further objects and features of the present invention will be apparent upon a perusal of the following specification and drawing in which:

FIGURE 1 is an elevational view of one side of the stator assembly of an alternator utilizing the subject invention;

FIGURE 2 is a cross sectional view of the structure shown in FIGURE 1 and taken along the line 2—2 of FIGURE 1;

FIGURE 3 is an isometric view of a mandrel arrangement for winding the alternating-current or stator windings;

FIGURE 4 is a top plan view showing the stator windings removed from the mandrel of FIGURE 3 and partially shaped preparatory to mounting on the stator frame; and FIGURE 5 is an enlarged isometric view of the coils of FIGURE 4 showing the arrangement of the adjacent windings thereof.

The present embodiment is the preferred embodiment but it is to be understood that changes can be made in the present embodiment by one skilled in the art without departing from the spirit and scope of the present invention.

Generally, the present invention is shown as applied to an alternator of the single phase type. The stator which carries the alternating-current windings is mounted on a base plate. The poles of the stator frame are formed with parallel sides so that the spaces between the poles are wedge-shaped. A single winding is wound around each pole with no lap between pole windings and with adjacent pole windings being wound in opposite directions. The wedge-shaped spaces between the stator poles are wide enough to permit air to circulate through those spaces. The stator is also spaced from the base plate to permit air to pass therebetween.

The base plate also carries a full wave rectifier assembly, a brush assembly for the field or rotor windings, and is provided with a hole for carrying a shaft upon which the rotor assembly is rotatively carried. The method of the invention generally comprises the winding of all of the stator coils at one time on a mandrel, removing the wound conductor from the mandrel, rotating a number of conductor turns as a group through an angle of approximately 180° in one direction for forming one coil, and successively repeating the turning of a group of turns through alternate and opposite 180° whereby the result is a series of oppositely wound electrical coils. Those individual and interconnected coils are then slid over the poles of the stator.

In detail, the stator assembly comprises a base plate 10 which carries a stator frame 11. The outer periphery of the base plate 10 and stator frame 11 are substantially hexagonally shaped. The stator frame 11 is formed of a material such as iron and is laminated to reduce eddy currents in the iron and a fiber member 12 is carried on each face thereof. The stator frame 11 is mounted in a parallel spaced apart relationship to the base plate 10 by a plurality of post assemblies 13. The intermediate portion of each of the post assemblies 13 is enlarged in diameter to define a spacer portion. One end of each of the post assemblies 13 extends through an opening formed through the stator frame 11. That extending end of each post assembly 13 is upset to firmly secure the stator frame 11 to the post assemblies 13. The other end of each post assembly 13 extends through an opening formed through the base plate 10, and that end of each post assembly 13 is secured to the base plate 10 by a screw 14 and a washer 15. Each washer 15 engages the rearward side of the base plate 10, and each screw 14 is threaded into one of the post members 13. In lieu of one of the screws 14, a terminal post may be provided for conveniently connecting a ground conductor to the base plate 10.

The stator frame 11 is substantially annular in shape with a plurality of poles 17 disposed about the inner periphery thereof. The side walls 17a of each pole are disposed parallel to each other. This construction provides that the slots between the poles are substantially wedge-shaped. The number of poles may vary, however, in one reduction to practice, the stator frame 11 was provided with 36 poles.

The coils 18 for the stator are initially formed on a mandrel such as mandrel 20 of FIGURE 3. The mandrel 20 is rotatively mounted by any suitable arrangement known in the art. The projecting shank of the mandrel 20 is provided with a height and width substantially equal to the height and width of the poles 17 of the stator. A length of an insulated electrical conductor 21 is directed onto the shank of the mandrel 20 as the mandrel 20 rotates to spirally wind one continuous coil 22 of a length substantially equal to the sum of the lengths of the coils 18 of the stator. The coil 22 is then slid from the shank of the mandrel 20, and beginning at one end of the coil 22, a certain number of turns thereof are turned as a group about the longitudinal axis of the incremental length of wire connecting that group of windings to the remainder of the coil 22. This turning of the first group of windings of the coil 22 is shown as coil 18a in FIGURE 4. As viewed in FIGURE 4, the turning of the coil 18a from the remainder of the coil 22 was directed in a clockwise direction. The second coil is formed by turning a second group of the same number of turns as the first group in a similar manner away from the coil 22 but in the opposite turning direction. The second coil is designated coil 18b in FIGURE 4 and it may be seen that that coil was formed by turning the second group of windings in a counterclockwise direction away from the remainder of the coil 22. This described process is repeated until the entire coil 22 has been formed into a plurality of interconnected coils 18. FIGURE 4 shows the completion of seven coils 18. FIGURE 5 shows that the described method for forming the coils 18 results in an arrangement wherein adjacent coils 18 are wound in opposite directions. Considering the three coils 18 of FIGURE 5, it may be seen that if coil 18c is considered as wound in a counterclockwise direction, coil 18d has been wound in a clockwise direction, while coil 18e has been wound in a counterclockwise direction.

The coils 18 are then bent into a relatively small lapped circle and inserted into the open center of the stator frame 11 for mounting on the poles 17. Each coil 18 is then slid upon one of the poles 17 to position all of the coils 18 on the poles 17 as shown in FIGURE 1. Paper inserts may be positioned in each of the slots between the poles 17 prior to the mounting of the coils 18 to electrically insulate each coil 18 from the poles 17.

The base frame 10 of the stator assembly carries a full wave rectifier assembly for converting the alternating-current output of the coils 18 into pulsating direct-current. The rectifier assembly comprises a pair of rectifier cells 25 and a pair of rectifier cells 26. The rectifier cells 25 and 26 may be of any suitable type such as silicon rectifier cells. Each rectifier cell 25 and 26 is a half wave rectifier and comprises a center lead connected to one side of the cell and a case or housing electrically connected to the other side of the cell. The pairs of cells 25 and 26 internally differ in respect to their polarity. In other words, if the pair of cells 25 are of the type wherein the negative side of the cell is connected to the case, the rectifiers 26 are of the type wherein the positive side of the cell is connected to the case. As may be seen in FIGURES 1 and 2, the cases of the rectifiers 25 are secured in a pair of holes through the base plate 10 and are spaced from the hole 27 which is provided for the shaft which carries the rotor, a distance sufficient to prevent any interference between the rectifier 25 and the shaft. The cases of the rectifiers 25 must be mounted in the base plate 10 in good electrical contact therewith. The cases of the rectifiers 26 are carried in a metal member 30, and the arrangement must be such that current may easily flow between the cases of the rectifier 26 and the member 30. The ends of the members 30 are secured by screws 31 to the base plate 10 with the member 30 positioned partially about the opening 27 sufficiently removed therefrom to prevent any interference with the rotor shaft. The screws 31 are not electrically connected to the base plate 10 but are insulated therefrom by insulator bushings 32. The leads 34 of the rectifiers 25 are each connected to one of the leads 35 of one of the rectifiers 26 and one of the leads 21 of the series of stator coils 18 to define a full wave rectifier bridge.

It has previously been noted that the base plate 10 is provided with hole 27 for carrying the shaft for the rotor assembly. A brush assembly is further provided for connecting one side of the rotor coils to a source of direct current. The noted brush assembly comprises a carbon brush 38 which is slidably carried in a brush container 40 which in turn is secured to a plate 41. The plate 41 is provided with a terminal post 44, and is mounted on an electrical insulator 45 with the terminal 44 extending through an opening in the insulator 45. The brush assembly is mounted on the base plate 10 with the terminal post 44 extending through a suitable opening therein. The terminal post 44 is electrically insulated from the base plate 10 by an electrical insulator bushing 46, and the brush assembly is secured to the base plate 10 by a nut 47 which is threaded onto the terminal post 44. The brush 38 is positioned to project along a line parallel to the axis of the opening 27. To prevent the brush assembly from accidental rotation about the axis of the terminal post 44, the insulator plate 45 may be widened such as shown in FIGURE 1 and provided with pin means 48 extending into suitable holes in the base plate 10 to key the brush assembly against accidental movement.

Having described the invention what is considered as new and desired to be protected by Letters Patent is:

1. A method of making a series of oppositely wound electrical coils comprising the steps of supplying an elongated mandrel having a generally uniform cross section similar to the desired cross section of the coils, winding an insulated electrical conductor on said mandrel in a single layer of side-by-side turns for a substantial length of said mandrel, removing said wound conductor from said mandrel, rotating a number of conductor turns as a group through an angle of approximately 180° in one direction for forming one coil, and successively repeating the turning of a group of turns through alternate and opposite 180° whereby the result is a series of oppositely wound electrical coils.

2. A method as set forth in claim 1 in which the series of coils is formed in a circle so that passageways formed through the coils extend radially from the center of the formed circle.

3. A method as set forth in claim 1 in which each group of coils is provided with the same number of turns.

4. In an alternator having a stator frame comprising a plurality of spaced-apart stator poles positioned on the circumference of a circle, the method for providing a series of alternately oppositely wound single layer stator poles for said stator comprising the steps of forming a rotatable mandrel with a shank portion having a height and width substantially equal to the height and width of said stator poles and a length at least as great as the sum total of the lengths of said stator poles, applying a length of an insulated electrical conductor to one end of said shank portion of said mandrel, rotating said mandrel and directing said conductor on said shank portion of said mandrel to form a single coil of a single layer and of a length equal to the sum total length of the desired stator coils, removing said single coil from said shank of said mandrel, counting off a unit number of turns of said coil from one end thereof and rotating said unit number of turns as a group from the remainder of said coil about an incremental length of said conductor representing the height of said stator coils through an angle of approximately 180° in one direction, and successively repeating the turning of a group of turns and alternately reversing the direction of turning.

5. In the method as defined in claim 4, the further step of bending said completed groups of turns in a lapped circle sufficiently small to be positioned within the circle defined by said stator poles, and successively sliding each of said groups of turns on one of said stator poles as a stator coil.

References Cited

UNITED STATES PATENTS

| 1,167,722 | 1/1916 | Scott | 140—92.1 |
| 1,406,092 | 2/1922 | Schulz et al. | 140—92.2 |
| 1,451,374 | 4/1923 | Rogers | 140—92.2 |
| 2,011,114 | 8/1935 | Papin | 140—92.2 X |
| 2,516,114 | 7/1950 | Green | 310—156 |
| 2,769,106 | 10/1956 | Dembowski | 310—27 X |

JOHN F. CAMPBELL, Primary Examiner

C. E. HALL, Assistant Examiner

U.S. Cl. X.R.

29—605, 598; 140—71.5; 242—9